(12) United States Patent
Inagawa et al.

(10) Patent No.: US 9,344,149 B2
(45) Date of Patent: *May 17, 2016

(54) POWER LINE CARRIER TRANSMISSION APPARATUS AND COMMUNICATION SYSTEM

(71) Applicant: Renesas Electronics Corporation, Kawasaki-shi (JP)

(72) Inventors: Osamu Inagawa, Kanagawa (JP); Kiyoshi Yanagisawa, Kanagawa (JP); Toshiya Aramaki, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,923

(22) Filed: Jun. 19, 2015

(65) Prior Publication Data

US 2015/0288420 A1   Oct. 8, 2015

Related U.S. Application Data

(63) Continuation of application No. 13/861,320, filed on Apr. 11, 2013, now Pat. No. 9,065,543.

(30) Foreign Application Priority Data

May 7, 2012   (JP) ................... 2012-105866

(51) Int. Cl.
*H04L 25/00* (2006.01)
*H04B 3/54* (2006.01)
(Continued)

(52) U.S. Cl.
CPC .............. *H04B 3/542* (2013.01); *H04L 1/0071* (2013.01); *H04L 1/08* (2013.01); *H04L 27/2605* (2013.01)

(58) Field of Classification Search
CPC ............ H04L 25/0272; H04L 25/0292; H04L 27/265
USPC ......................... 375/257, 219, 222, 260, 295; 340/310.01
See application file for complete search history.

(56) References Cited

U.S. PATENT DOCUMENTS 6,288,631 B1   9/2001   Shinozaki et al.
8,284,856 B2   10/2012   Sato et al.
(Continued)

FOREIGN PATENT DOCUMENTS

JP   H11-266190 A   9/1999
JP   2000-022771 A   1/2000
(Continued)

OTHER PUBLICATIONS

United States Notice of Allowance dated Feb. 27, 2015 in U.S. Appl. No. 13/861,320.
United States Office Action dated Dec. 12, 2014 in U.S. Appl. No. 13/861,320.
United States Office Action dated Jun. 27, 2014 in U.S. Appl. No. 13/861,320.
(Continued)

*Primary Examiner* — Khai Tran
(74) *Attorney, Agent, or Firm* — McGinn IP Law Group, PLLC

(57) ABSTRACT

A power line carrier transmission apparatus for transmitting a transmission symbol via a power line, the power line carrier transmission apparatus including an interleave unit interleaving the transmission symbol, a modulation unit for modulating the transmission symbol interleaved by the interleave unit, and a transmission unit repeatedly transmitting the transmission symbol modulated by the modulation unit M times (where M is an integer larger than 1), wherein M symbols (where M denotes the number of the symbols), which are generated by repeatedly transmitting the transmission symbol M times by the transmission unit, are transmitted without guard intervals being added therebetween.

6 Claims, 9 Drawing Sheets

(51) Int. Cl.
*H04L 1/08* (2006.01)
*H04L 1/00* (2006.01)
*H04L 27/26* (2006.01)

(56) References Cited

U.S. PATENT DOCUMENTS

| | | |
|---|---|---|
| 9,065,543 B2 * | 6/2015 | Inagawa et al. |
| 2004/0160990 A1 * | 8/2004 | Logvinov et al. ............. 370/509 |
| 2011/0110459 A1 | 5/2011 | Abraham |
| 2011/0143694 A1 | 6/2011 | Iwamura |
| 2012/0099628 A1 * | 4/2012 | Kim et al. .................... 375/222 |

FOREIGN PATENT DOCUMENTS

| | | |
|---|---|---|
| JP | 2007-259400 A | 10/2007 |
| JP | 2008-172849 A | 7/2008 |
| JP | 2008-219502 A | 9/2008 |
| JP | 2009-095058 A | 4/2009 |

OTHER PUBLICATIONS

Japanese Office Action dated Mar. 15, 2016 with an English translation thereof.

* cited by examiner

POWER LINE CARRIER TRANSMISSION APPARATUS AND COMMUNICATION SYSTEM

The present application is a Continuation Application of U.S. application Ser. No. 13/861,320 filed on Apr. 11, 2013, which claims priority from Japanese Patent Application No. 2012-105866 filed on May 7, 2012 the entirety of which is incorporated herein by reference.

BACKGROUND

The present invention relates to power line carrier communication apparatuses and communication systems, and more particularly to a power line carrier communication apparatus and a communication system in which symbols are transmitted via a power line.

Japanese Unexamined Patent Application Publication No. 2008-172849 discloses a power line carrier communication system. The communication environments of power lines are various depending on places and times, and some communication environments may be very poor in terms of their noise conditions or impedance conditions. Under such environments, the communication standards using the existing OFDM (Orthogonal Frequency Division Multiplexing) (such as G3-PLC and PRIME) are inadequate to carry out favorable communication. Therefore, a robuster communication method is necessary for such environments.

One of the robust communication methods is disclosed in Japanese Unexamined Patent Application Publication No. 2008-172849. According to Japanese Unexamined Patent Application Publication No. 2008-172849, the robustness of the communication method is retained by redundancy on a time axis. For example, when 80 symbols are to be transmitted, they are transmitted by being interleaved by 16 types of carrier frequencies (Refer to FIG. 2 and FIG. 3 in the above patent application publication). Specifically, plural symbol sequences are created by reordering transmission symbols on a time axis. Subsequently, plural input symbol sequences are modulated by different carrier frequencies respectively (Refer to the paragraph 0019 of the above patent application publication). Therefore, time-domain repeated signals are created at a prestage of frequency interleaving.

SUMMARY

Therefore, it becomes necessary to carry out interleave processing for each time-domain repeated signal. As a result, there occurs a problem in that a large amount of data processing is needed.

Other problems of the related arts and new features of the present invention will be revealed in accordance with the description about the specification of the present invention and the accompanying drawings hereinafter.

According to an aspect of the present invention, in a power line carrier transmission apparatus, an interleaved symbol is modulated using an OFDM scheme, and one time-domain OFDM signal is repeatedly transmitted.

According to the aspect of the present invention, a robust communication can be carried out with a small amount of data processing.

DETAILED DESCRIPTION

First Embodiment

Total Configuration of the System

Figure 1:
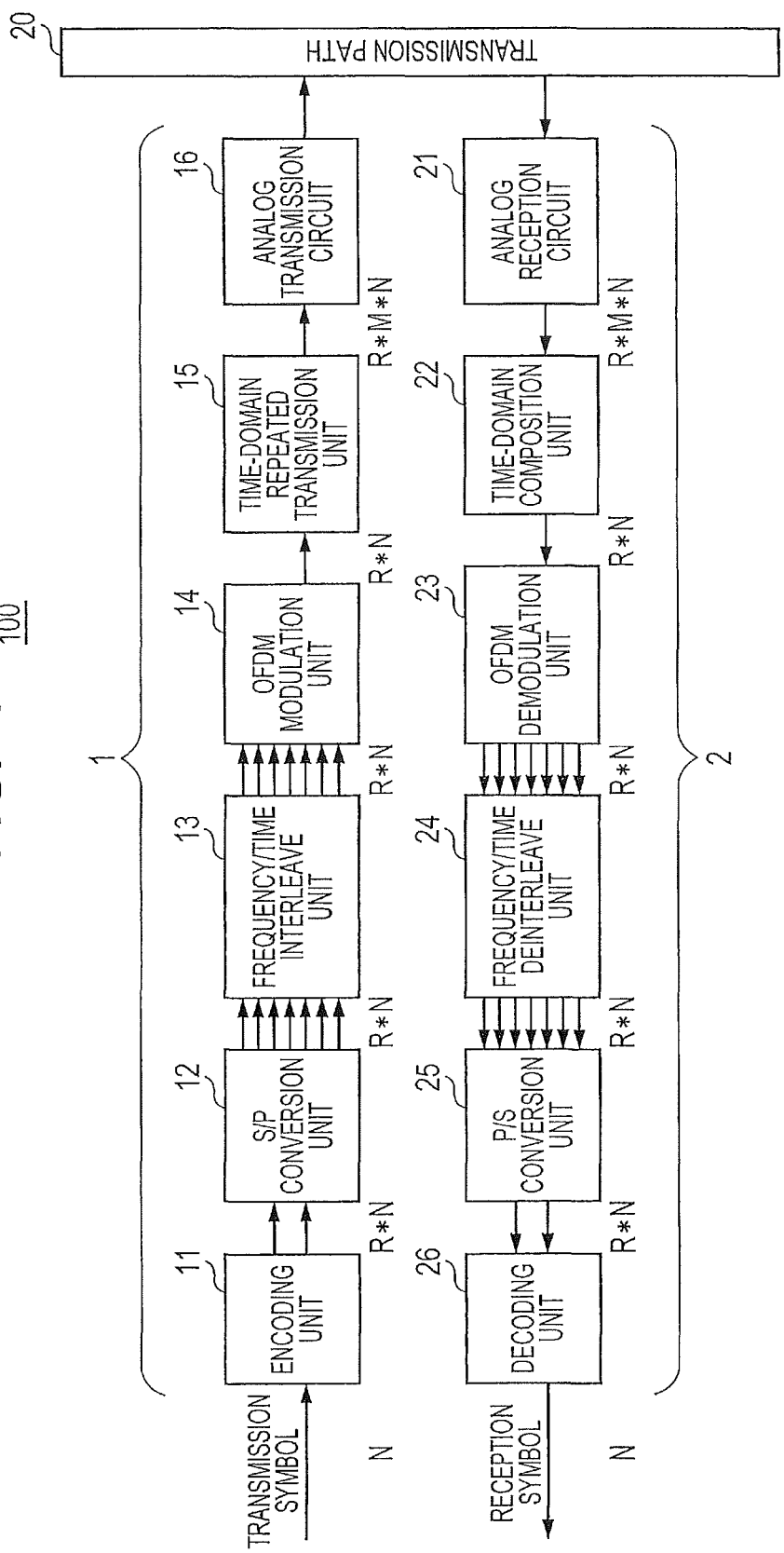
FIG. 1 is a block diagram showing the configuration of a power line carrier communication system according to a first embodiment.

The configuration of a power line carrier communication system according to this embodiment (referred to as a communication system hereinafter) will be described with reference to FIG. 1. The communication system 100 includes a transmission apparatus 1, a transmission path 20, and a reception apparatus 2. The transmission path 20 is, for example, a power line through which an alternate-current power (AC power) of 50 Hz or 60 Hz is transmitted. The transmission apparatus 1 and the reception apparatus 2 are connected to each other via the transmission path 20. The transmission apparatus 1 outputs a modulated symbol to the transmission path 20. The reception apparatus 2 receives the symbol output by the transmission apparatus 1 via the transmission path 20. In this way, the transmission apparatus 1 and the reception apparatus 2 perform data communication with each other via the transmission path 20. In this case, the communication system 100 performs communication using an OFDM scheme.

(Transmission Apparatus 1)

The transmission apparatus 1 includes an encoding unit 11, an S/P conversion unit 12, a frequency/time interleave unit 13, an OFDM modulation unit 14, a time-domain repeated transmission unit 15, and an analog transmission circuit 16.

The encoding unit 11 performs encoding processing for encoding a transmission symbol. Here, it will be assumed that the data amount of the transmission symbol is N (N is a natural number). For example, the encoding unit 11 adds check bits used for error correction to the transmission symbol. Therefore, the data amount of the transmission symbol is multiplied by R, and the data amount of the transmission symbol output from the encoding unit 11 becomes R×N. The S/P conversion unit 12 converts serial data into parallel data. With this conversion, the transmission symbols are converted into parallel data. Subsequently, the S/P conversion unit 12 outputs the transmission symbols, which have become the parallel data, to the frequency/time interleave unit 13.

The frequency/time interleave unit 13 interleaves the transmission symbol both in a frequency domain and a time domain. In other words, the frequency/time interleave unit 13 performs both frequency interleaving for distributing the transmission symbol data in the frequency domain and time interleaving for distributing the transmission symbol data in the time domain. In the frequency interleaving, the transmission symbol data are assigned to subcarriers of the later-described OFDM modulation. The data amount that is dealt with by the frequency/time interleave unit 13 becomes R×N.

The OFDM modulation unit 14 modulates the transmission symbol data, which have been interleaved, with the OFDM scheme. Because the OFDM modulation uses plural subcarriers (multiple-carriers), the transmission symbol data are multiplexed and transmitted in parallel. For example, the OFDM modulation unit 14 maps the transmission symbol data on the signal points on an IQ plane. Subsequently, an inverse Fourier transform is performed on the mapped transmission symbol data. The OFDM modulation unit 14 converts the interleaved subcarrier data into data on a time axis by performing IFFT (Inverse Fast Fourier Transform). In this way, the OFDM modulation unit 14 creates a modulated signal obtained by modulating the transmission symbol. In addition, the OFDM modulation unit 14 adds a preamble signal to the head of the modulated signal. The preamble signal is, for example, a signal obtained by modulating predetermined data with the OFDM scheme. Alternatively, the preamble signal can be a signal other than an OFDM signal (such as a chirp signal). The data amount that the OFDM modulation unit 14 deals with except the preamble becomes R×N.

The time-domain repeated transmission unit 15 repeatedly transmits one modulated signal obtained by modulating the transmission symbol using the OFDM modulation in the OFDM modulation unit 14. For example, the time-domain repeated transmission unit 15 includes a buffer or the like for storing a modulated signal corresponding to one symbol. The time-domain repeated transmission unit 15 repeatedly transmits the modulated signal stored by the buffer installed in the time-domain repeated transmission unit 15 at certain fixed time intervals. Here, it will be assumed that a modulated signal corresponding to one transmission symbol is repeatedly transmitted M times (M is a number that is 2 or larger). In addition, M can be an integer equal to 2 or larger. In this case, it is possible that guard intervals are not inserted between repeatedly transmitted symbols.

The data amount that the time-domain repeated transmission unit 15 deals with becomes R×M×N. The modulated signal that is repeatedly transmitted by the time-domain repeated transmission unit 15 is amplified by an amplifier in the analog transmission circuit 16, and is output to the transmission path 20. As described above, the time-domain repeated transmission unit 15 repeatedly outputs the same transmission symbol M times to the transmission path 20.

(Reception Apparatus 2)

Next, the reception apparatus 2 will be described. The reception apparatus 2 includes an analog reception circuit 21, a time-domain composition unit 22, an OFDM demodulation unit 23, a frequency/time deinterleave unit 24, a P/S conversion unit 25, and a decoding unit 26.

The analog reception unit 21 receives the modulated signal transmitted by the transmission apparatus 1 via the transmission path 20. In this case, because an alternate-current power is supplied to the transmission path 20, the alternate-current power voltage is superimposed on the modulated signal. The analog reception circuit 21 includes an amplifier that amplifies the received reception signal with a predefined gain. The reception signal includes M symbols (where M is the number of symbols) created by the transmission symbol being repeatedly transmitted M times by the transmission apparatus 1. In addition, the reception signal includes the preambles added to the heads of the symbols. Subsequently, the analog reception circuit 21 AD-converts the amplified reception signal, and outputs the AD-converted signal to the time-domain composition unit 22. In addition, the processing performed by the analog reception circuit 21 will be described in detail later.

The time-domain composition unit 22 performs composition in the time domain using the M symbols created by the transmission symbol being repeatedly transmitted M times. For example, the time-domain composition unit 22 averages the M symbols created by the transmission symbol being repeatedly transmitted M times. In other words, the time-domain composition unit 22 composes one reception symbol using the M symbols created by the transmission symbol being repeatedly transmitted M times. In addition, the processing performed by the time-domain composition unit 22 will be described in detail later. The M symbols created by the transmission symbol being repeatedly transmitted M times are converted into one reception symbol. Therefore, after the conversion, the data amount becomes one Mth, and the data amount to be dealt with by the OFDM demodulation unit 23 in the later stage becomes R×N.

The OFDM demodulation unit 23 demodulates the reception signal of the reception symbol, which is composed in the time domain, with the OFDM scheme. In addition, the processing performed by the OFDM demodulation unit 23 will be described in detail later. The frequency/time deinterleave unit 24 deinterleaves the reception symbol included in the reception signal demodulated with the OFDM scheme. The frequency/time deinterleave unit 24 performs deinterleaving in the reverse order of the interleaving performed by the frequency/time interleave unit 13. With this deinterleaving, the data distributed both in the frequency domain and the time domain are put back into their original places. The data amount that the frequency/time deinterleave unit 24 deals with becomes R×N.

The P/S conversion unit 25 converts the parallel data of the reception symbol deinterleaved by the frequency/time deinterleave unit 24 into serial data. The P/S conversion unit outputs the reception symbol that is converted into the serial data to the decoding unit 26. Subsequently, the decoding unit 26 decodes the data of the reception symbol that are converted into the serial data. The decoding unit 26 decodes the data of the reception symbol in the reverse order of the encoding performed by the encoding unit 11. With this decoding, the data amount of the reception symbol gets back from R×N to N.

Figure 2:
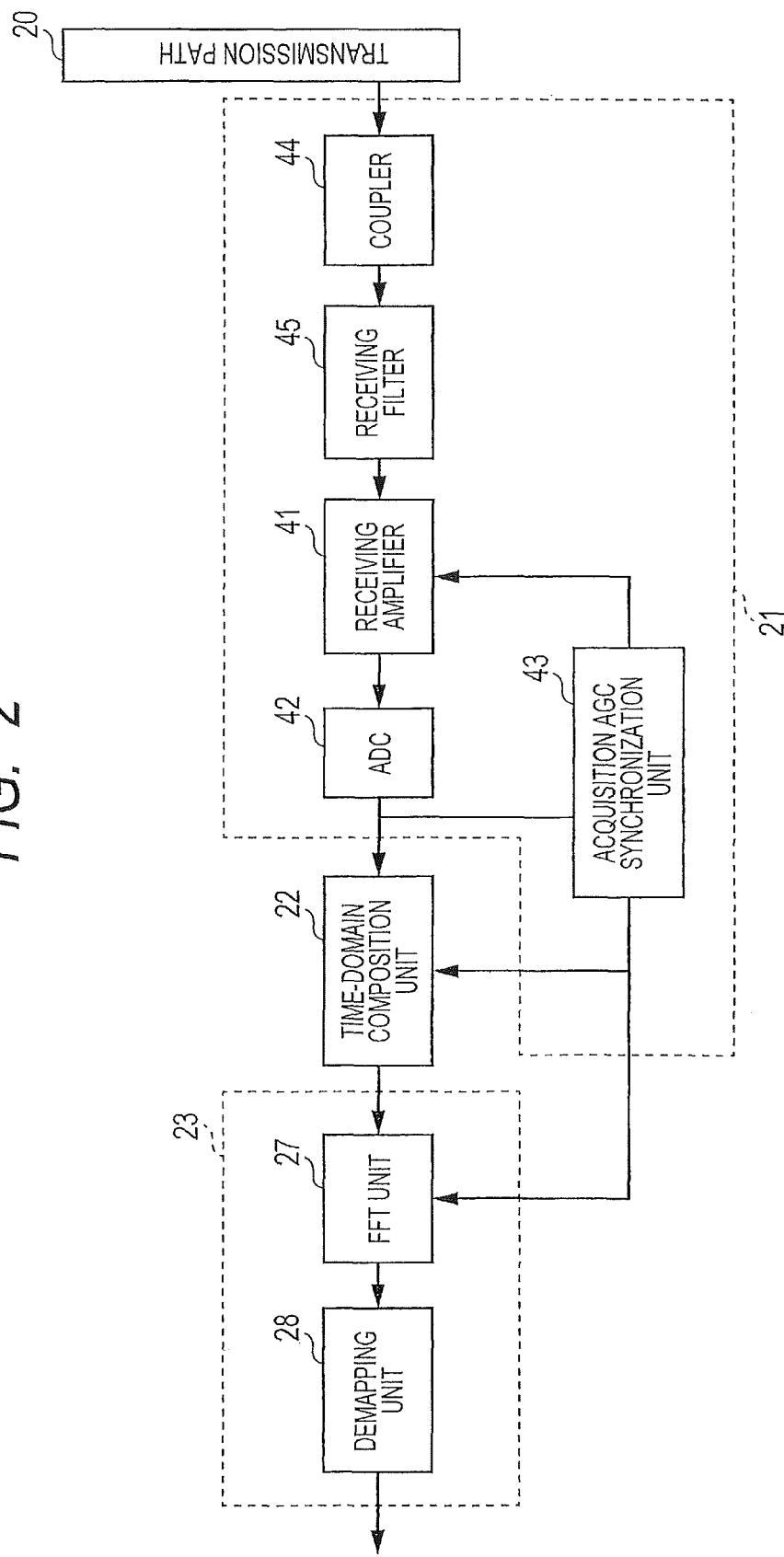
FIG. 2 is a block diagram showing the detailed configurations of an analog reception circuit and an OFDM demodulation unit both of which are installed in a reception apparatus.

Next, the processing performed by the analog reception circuit and the processing performed by the OFDM demodulation unit 23 will be described in detail with reference to FIG. 2. FIG. 2 is a block diagram showing the configuration examples of the analog reception circuit 21 and the OFDM demodulation unit 23.

(Analog Reception Circuit 21)

First, the configuration of the analog reception circuit 21 will be described. The analog reception circuit 21 includes a coupler 44, a receiving amplifier 41, an ADC (Analog Digital Converter) 42, and an acquisition AGC (Automatic Gain Control) synchronization unit 43.

The coupler 44 is coupled with the transmission path 20, and receives a reception signal that propagates through the transmission path 20. Next, the coupler 44 outputs the reception signal to the receiving filter 45. The coupler 44 and the receiving filter 45 separate the OFDM signal and the alternate-current power. The receiving amplifier 41 receives the reception signal, which propagates through the transmission path 20, via the coupler 44 and the receiving filter 45, and amplifies the reception signal with a predefined gain. The ADC 42 creates a digital reception signal by AD-converting the reception signal amplified by the receiving amplifier 41. The acquisition AGC synchronization unit 43 adjusts the gain of the receiving amplifier 41. For example, on detecting a preamble predetermined, the acquisition AGC synchronization unit 43 adjusts the receiving gain in accordance with the input level to the ADC 42 on the basis of the digital reception signal obtained after the AD-conversion. In other words, on detecting a preamble signal corresponding to the preamble, the acquisition AGC synchronization unit 43 adjusts the gain of the receiving amplifier 41.

In addition, the acquisition AGC synchronization unit 43 establishes frame synchronization by detecting borders among preamble signals and payloads. The acquisition AGC synchronization unit 43 notifies the time-domain composition unit 22 and an FFT unit 27 of the OFDM demodulation unit 23 of this timing for the frame synchronization. Owing to the above notification, the time-domain composition unit 22 and the OFDM demodulation unit 23 can work in synchronization with each other. For example, on detecting the preamble from the reception signal obtained after the AD-conversion, the acquisition AGC synchronization unit 43 adjusts the timing of processing performed by the time-domain composition unit 22 in accordance with the detected timing of the preamble. With this adjustment, the symbol borders of the repeated symbols are determined. Subsequently, the time-domain composition unit 22 performs time-domain composition using the M symbols which are created by the transmission symbol with a predefined symbol length being repeatedly transmitted M times. In a similar way to the above, the acquisition AGC synchronization unit 43 controls the processing performed by the FFT unit 27 in accordance with the detected timing of the preamble.

(OFDM Demodulation Unit 23)

The OFDM demodulation unit 23 includes the FFT unit 27 that Fourier-transforms the reception symbol and a demapping unit 28 that performs demapping. For example, the FFT unit 27 performs FFT (Fast Fourier Transform) on the data of the reception symbol composed by the time-domain composition unit 22 to transform the data of the reception symbol into complex data in the frequency domain. Next, the frequency-domain complex data are demodulated through points, which are depicted by the frequency-domain complex data, on the complex plane being demapped by the demapping unit 28, with the result that the data of the reception symbol are retrieved. In addition, the timing of processing performed by the FFT unit 27 is controlled by the acquisition AGC synchronization unit 43. With the above control, the FFT can be performed with an appropriate timing on one reception symbol composed by the time-domain composition unit 22. Subsequently, the data of the reception symbol obtained after the demapping are output to the frequency/time deinterleave unit 24.

(Time-Domain Composition Unit 22)

Figure 3:
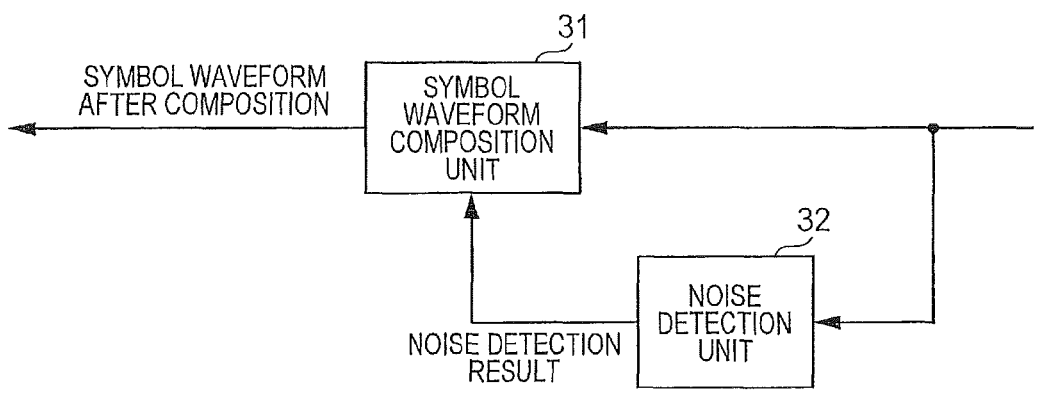
FIG. 3 is a block diagram showing the detailed configuration of a time-domain composition unit installed in the reception apparatus.
Figure 4:
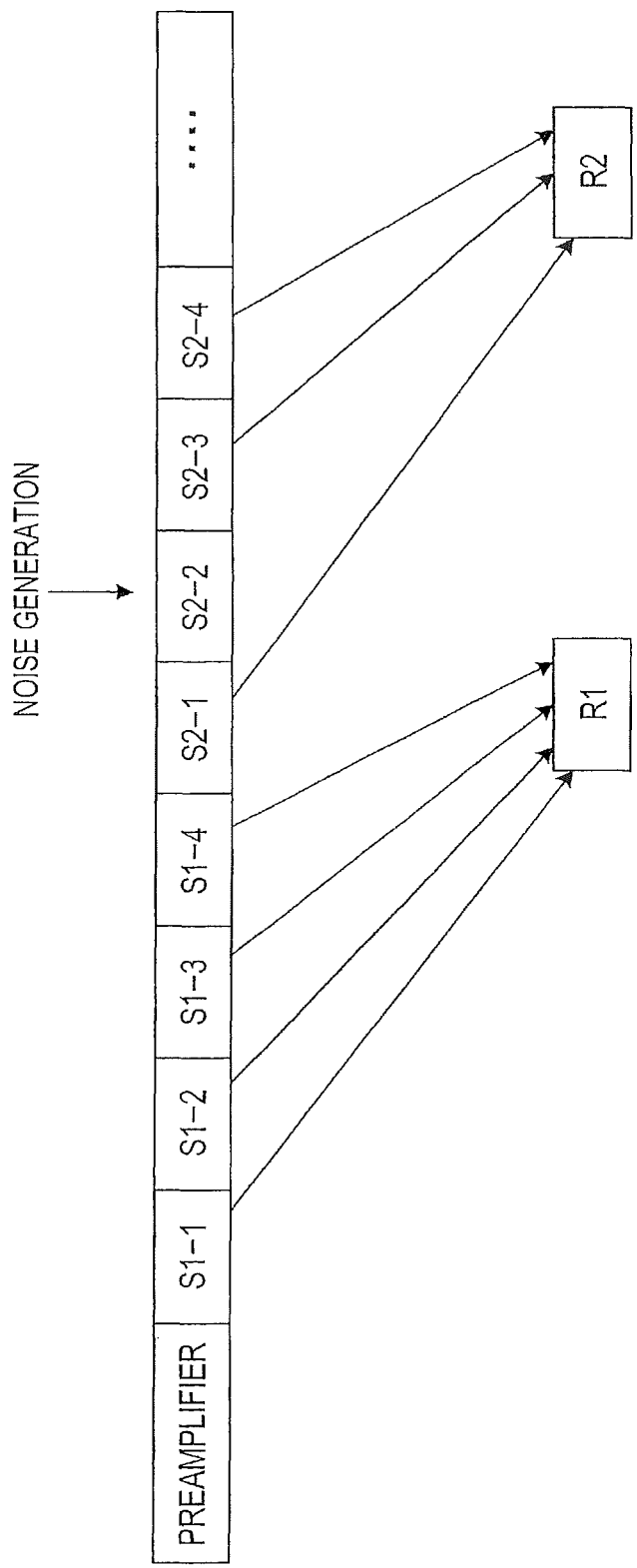
FIG. 4 is a timing chart schematically showing symbols used in a composition in a time domain.

Next, the processing performed by the time-domain composition unit 22 will be described with reference to FIG. 3 and FIG. 4. FIG. 3 is a block diagram showing an example of the configuration of the time-domain composition unit 22. FIG. 4 is a timing chart showing processing in which composition is performed in a time domain using symbols and a reception symbol is created. FIG. 4 shows an example in which one transmission symbol is repeatedly transmitted four times.

The time-domain composition unit 22 includes a symbol waveform composition unit 31 and a noise detection unit 32. The symbol waveform composition unit 31 averages the M symbols created by the transmission symbol being repeatedly transmitted M times. For example, as shown in FIG. 4, it will be assumed that the first group of four symbols, which are created by the transmission symbol being repeatedly transmitted four times, includes symbols S1-1, S1-2, S1-3, and S1-4. In a similar way, it will be assumed that the second group of four symbols, which are created by the transmission symbol being repeatedly transmitted four times, includes symbols S2-1, S2-2, S2-3, and S2-4. For example, the symbols S1-1, S1-2, S1-3, and S1-4, and the symbols S2-1, S2-2, S2-3, and S2-4 have the same symbol lengths, and they are continuously transmitted.

The symbol waveform composition unit 31 outputs a composited symbol waveform to the OFDM demodulation unit 23. Although there may be various composition methods, it will be assumed in this case that a method in which the symbol waveform composition unit 31 averages the symbols S1-1 to S1-4 is adopted. A preamble is added to the head of the first symbol S1-1. As described above, the symbol waveform composition unit 31 averages the symbols S1-1 to S1-4 in accordance with the timing of detection of the preamble by the acquisition AGC synchronization unit 43. In other words, since the acquisition AGC synchronization unit 43 has already detected the preamble, the symbol waveform composition unit 31 can detect borders between the symbols S1-1 to S1-4. Owing to this detection, the symbol waveform composition unit 31 can average the symbols S1-1 to S1-4 to compose a reception symbol R1. In this way, the symbol waveform composition unit 31 composes one reception symbol R1 by averaging the four symbols S1-1 to S1-4 created by the transmission symbol being repeatedly transmitted M times (in this example, M=4).

Here, although the symbols S1-1 to S1-4 have the same signal waveforms at the transmission apparatus 1 side, these symbols have different signal waveforms at the side of the reception apparatus 2 owing to the communication environment including the transmission path 20 and the like. For example, if a noise is generated on the transmission path 20, the analog reception circuit 21 receives a reception signal having a symbol on which the noise is superimposed.

In the case where a noise is superimposed on a symbol, there is fear that the data of the reception symbol obtained by demodulating symbols is not correct. Therefore, in this embodiment, the noise detection unit 32 detects a noise generated in the transmission path 20. The noise detection unit 32 outputs the noise detection result to the symbol waveform composition unit 31. Subsequently, the symbol waveform composition unit 31 performs composition using the symbols except a symbol obtained at the timing of the noise detection.

For example, as shown in FIG. 4, it will be assumed that a noise is generated in the symbol S2-2 of the symbols S2-1 to S2-4. In this case, the symbol waveform composition unit 31 averages the symbol S2-1, the symbol S2-3, and the symbol S2-4 except the symbol S2-2. In other words, the symbol waveform composition unit 31 calculates a reception symbol R2 by averaging the above three symbols. In general, the symbol waveform composition unit 31 averages the symbols except some symbols of M symbols created by the transmission symbol being repeatedly transmitted M times (M=4 in this case) in the time domain. Subsequently, as described above, the calculated reception symbol by averaging is OFDM-demodulated by the OFDM demodulation unit 23.

For example, the noise detection unit 32 calculates the power of each symbol. If a noise is mixed in a symbol, the power of the symbol becomes larger. Therefore, if the noise detection unit 32 receives a symbol whose power is equal to a certain threshold or larger, the noise detection unit 32 judges that a noise is mixed in the symbol. The noise detection unit 32 informs the symbol waveform composition unit 31 of the noise detection result. The symbol waveform composition unit 31 averages the symbols except the symbol S2-2 in which the noise is mixed. The symbol waveform composition unit 31 performs composition using the symbols except the symbol S2-2 among the M symbols because the power of the reception signal of the symbol S2-2 exceeds the threshold of the M symbols. In such a way, the adverse effect of a suddenly generated noise can be reduced.

Alternatively, it is also conceivable that the time-domain composition unit 22, in which no noise detection unit is installed, performs composition using the M symbols created by the transmission symbol being repeatedly transmitted M times regardless of the presence or absence of noises. In other words, regardless of the presence or absence of a noise, all the M symbols created by the transmission symbol being repeatedly transmitted M times can be averaged. In addition, it is also conceivable that the time-domain composition unit 22 performs composition using the M symbols through a maximum ratio combining method or the like.

In addition, after the transmission symbol is interleaved and OFDM-modulated, the time-domain repeated transmission unit 15 repeatedly transmits the transmission symbol M times. With the above procedures, the amount of processing dealt with by the frequency/time interleave unit 13 and the OFDM modulation unit 14 can be reduced. In other words, because the amount of data processing dealt with by the FFT and the interleaving can be reduced, the total amount of data processing can be reduced. Therefore, a processing time can be shortened.

Figure 5:
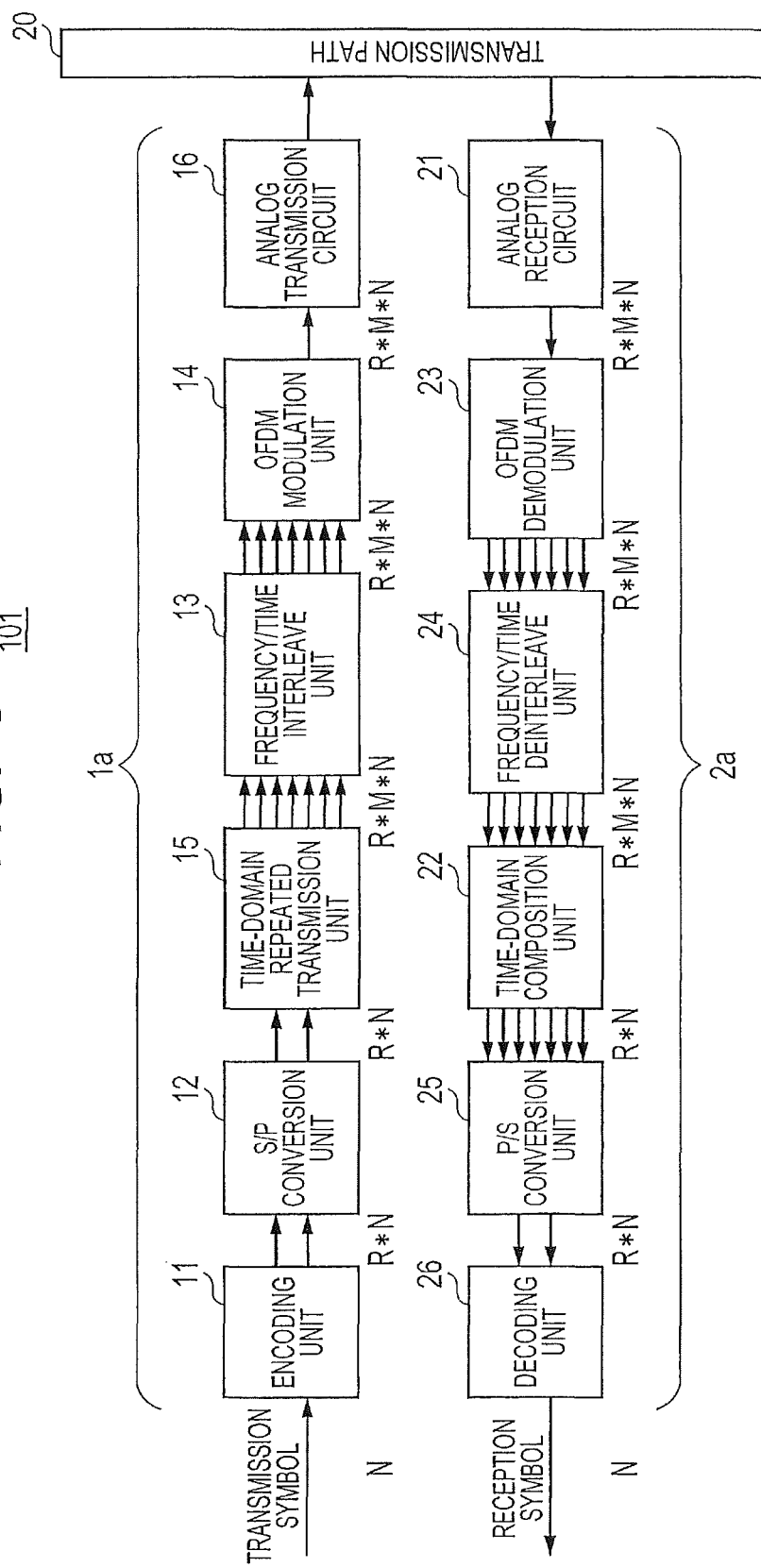
FIG. 5 is a block diagram showing a communication system according to a comparative example.

For example, as shown by a comparative example in FIG. 5, it will be assumed that encoding, S/P conversion, time-domain repeated transmission, frequency interleaving, and OFDM modulation are performed on a transmission symbol with a data amount N in this order. If the data amount is multiplied by R in the encoding, and the transmission symbol is repeatedly transmitted M times in the time domain, the data amount dealt with by the frequency interleaving and by the OFDM modulation becomes R×M×N. Therefore, the data amount dealt with by the frequency/time interleave unit 13 and by the OFDM modulation unit 14 becomes M times the data amount dealt with in FIG. 1. In a similar way, in the reception apparatus 2, the data amount dealt with by the OFDM demodulation unit 23 and by the frequency/time deinterleave unit 24 becomes M times the data amount dealt with in FIG. 1. This means the amount of the OFDM modulation and demodulation processing and interleaving and deinterleaving processing become M times the data amount dealt with by the OFDM modulation in FIG. 1.

On the other hand, in the configuration shown in FIG. 1, the data amount dealt with by the OFDM demodulation unit 23 and the frequency/time deinterleave unit 24 can be reduced. In addition, the time-domain repeated transmission unit 15 has only to repeatedly transmit the same symbol that is stored in the buffer or the like. Therefore, a calculation for the repeated transmission becomes unnecessary, which leads to simplification of the repeated transmission processing. In addition, in FIG. 1, the reception apparatus 2 performs the OFDM demodulation and the deinterleaving after the composition by the time-domain composition unit 22. Therefore, in FIG. 1, it is also possible to reduce the data amount dealt with by the OFDM demodulation unit 24 and by the frequency/time deinterleave unit 24 in the reception apparatus 2.

As described above, a robust communication using a small data amount can be realized according to this embodiment of the present invention.

In this embodiment, it becomes possible not to insert guard intervals between the symbols as shown in FIG. 4. In other words, the last symbol S1-4 of the first group of symbols and the first symbol S2-1 of the second group of symbols are continuously transmitted. The symbols S-1 to S1-4 are created on the basis of the same transmission symbol. Therefore, under a condition in which there is no noise, the symbols S1-1 to S1-4 are received as almost the same signals. In a similar way, the symbols S2-1 to S2-4 are received as almost the same signals under the same condition.

In addition, a part of the symbols created by the transmission symbol being repeatedly transmitted can be used as a guard interval. To put it concretely, a beginning part or an ending part of the M symbols created by the transmission symbol being repeatedly transmitted M times can be used as a guard interval. By using the beginning part or ending part of the M symbols as a guard interval, the deterioration of demodulation characteristic owing to multipaths can be suppressed. In addition, because there is no guard intervals between the M symbols, the reception signal can be effectively utilized, which leads to the improvement of the reception characteristic of the reception apparatus according to this embodiment. In addition, compared with a general OFDM modulation scheme in which a guard interval is added to each symbol, the OFDM modulation scheme according to this embodiment can more effectively prevent the deterioration of transmission rate.

On the other hand, in the configuration of the comparative example shown in FIG. 5, symbols are interleaved after being created by the transmission symbol being repeatedly transmitted in a time domain. Therefore, the symbols that are continuously transmitted are different from each other. As a result, it is necessary to insert guard intervals between the symbols transmitted by a general OFDM modulation scheme. Owing to the guard intervals being inserted between the symbols, the transmission rate of the comparative example is lower than that of this embodiment.

Second Embodiment

Figure 6:
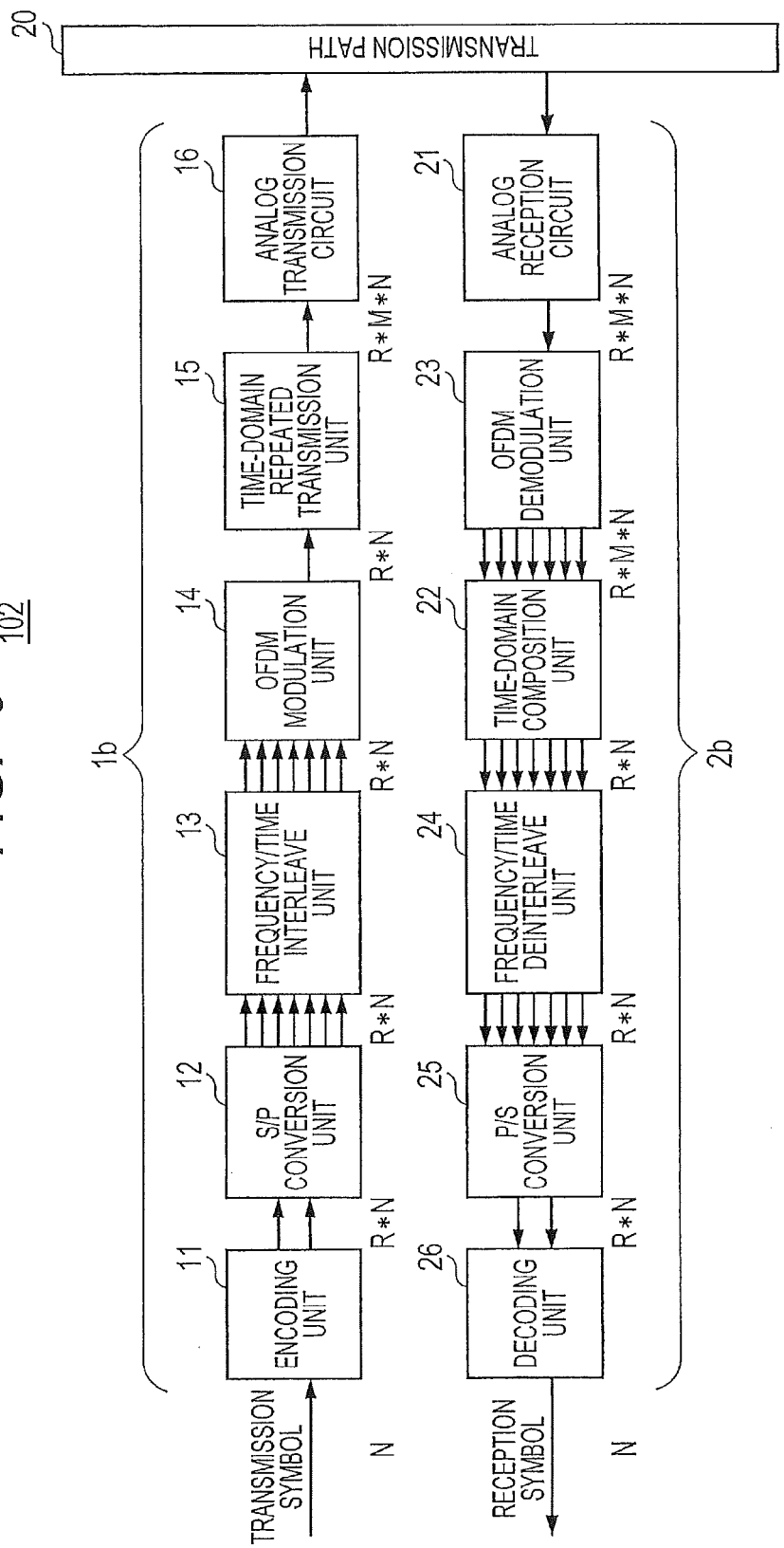
FIG. 6 is a block diagram showing the configuration of a power line carrier communication system according to a second embodiment.

A communication system 102 according to this embodiment will be described with reference to FIG. 6. In this embodiment, the disposition order of an OFDM demodulation unit 23 and a time-domain composition unit 22 is opposite to that of the first embodiment. The dispositions of other units other than the OFDM demodulation unit 23 and the time-domain composition unit 22 are the same as those of the first embodiment, explanation about the other units of this embodiment will be omitted.

In the second embodiment, after the OFDM demodulation unit 23 OFDM-demodulates the symbols, the time-domain composition unit 22 performs composition using these symbols. In other words, after FFT and demapping are performed on the symbols by the OFDM demodulation unit 23, the time-domain composition unit 22 performs composition using these symbols. Subsequently, a reception symbol composed by the time-domain composition unit 22 is deinterleaved by a frequency/time deinterleave unit 24. Therefore, the data amount dealt with by the frequency/time deinterleave unit 24 becomes R×N.

With above-described configuration, it is also possible to decrease the data amount dealt with by the frequency/time deinterleave unit 24. In addition, the configuration shown in FIG. 6 is effective in the case where the number of subcarriers is small with respect to an FFT size of the FFT. For example, there is a case where, after being transformed in a frequency domain by the FFT, the symbols are mapped without using a part of the frequency band. For example, there is a case where the symbols are mapped using only a hundred subcarriers out of five hundred subcarriers. In such a case, the data amount can be effectively reduced. According to this embodiment, a robust communication using a small data amount can be realized.

Here, the time-domain composition unit 22 calculates the average values of coordinates on an IQ plane. Specifically, the OFDM demodulator unit 23 calculates the coordinates of symbols S1-1 to S1-4 on the IQ plane. Subsequently, the time-domain composition unit 22 calculates the position of the reception symbol on the IQ plane using the average values of the coordinates of the symbols S1-1 to S1-4. With such a calculation, the reception symbol can be easily composed in the time domain.

In addition, as is the case of the first embodiment, it is conceivable that the symbols used for averaging are decided on the basis of a noise detection result. In other words, it is conceivable that a symbol transmitted at a timing when there is a large noise is not used for the averaging. It goes without saying that the symbols can be averaged regardless of the presence or absence of noises.

Third Embodiment

Figure 7:
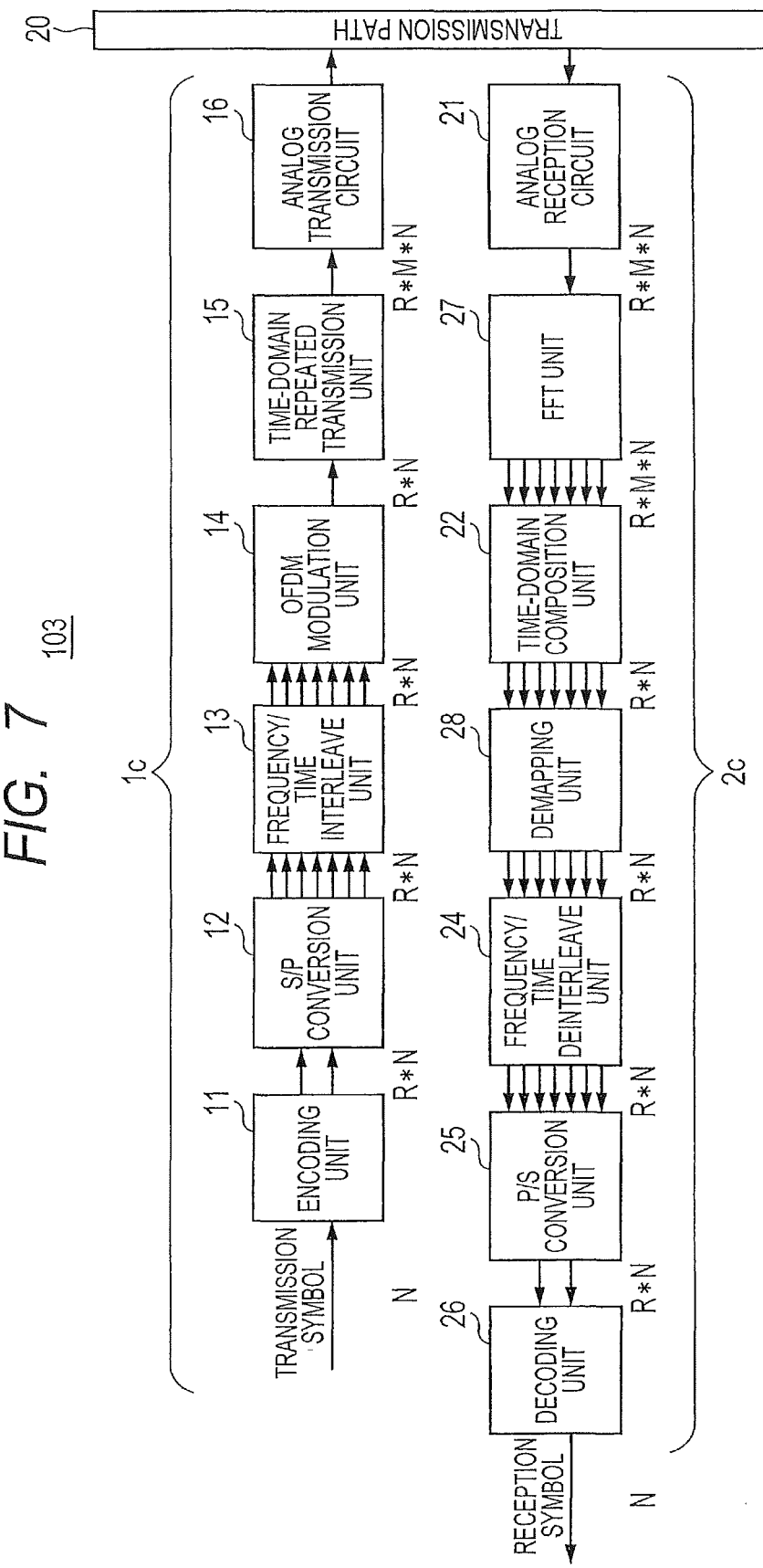
FIG. 7 is a block diagram showing the configuration of a power line carrier communication system according to a third embodiment.

The OFDM demodulation unit 23 according to the first embodiment includes the FFT unit 27 and the demapping unit 28 in a disposition order as shown in FIG. 2. In this embodiment, an FFT unit 27, a time-domain composition unit 22, and a demapping unit 28 are deposited as shown in FIG. 7. In other words, after the FFT unit 23 performs FFT processing, the time-domain composition unit 22 performs composition in a time domain. In addition, after the composition performed in the time domain by the time-domain composition 22, the demapping unit 28 performs demapping.

The time-domain composition 22 composes a reception symbol by averaging data of symbols in units of frequencies. For example, the FFT unit 27 performs the FFT on each of symbols S1-1 to S1-4. The time-domain composition 22 averages the frequency-domain data of the symbols S1-1 to S1-4 on which the FFT has already performed. By the above averaging, the frequency-domain data of the reception symbol is calculated. Subsequently, the demapping unit 28 performs demapping on reception symbol on the basis of the averaged frequency data.

Even with such a configuration, the data amount dealt with by a frequency/time deinterleave unit 24 can be reduced as is the case of the second embodiment. In addition, it is also possible to make the data amount dealt with the demapping unit 28 R×N. In addition, the configuration shown in FIG. 7 is effective in the case where the number of subcarriers is small with respect to an FFT size of the FFT. For example, there is a case where, after being transformed in a frequency domain by the FFT, the symbols are mapped without using a part of the frequency band. For example, there is a case where the symbols are mapped using only a hundred subcarriers out of five hundred subcarriers. In such a case, the data amount can be effectively reduced. Therefore, a robust communication using a small data amount can be realized according to this embodiment. In addition, in this third embodiment as is the case of the first embodiment, it is conceivable that the symbols used for averaging are decided on the basis of a noise detection result. In other words, it is conceivable that a symbol transmitted at a timing when there is a large noise is not used for the averaging. It goes without saying that the symbols can be averaged regardless of the presence or absence of noises.

Fourth Embodiment

Figure 8:
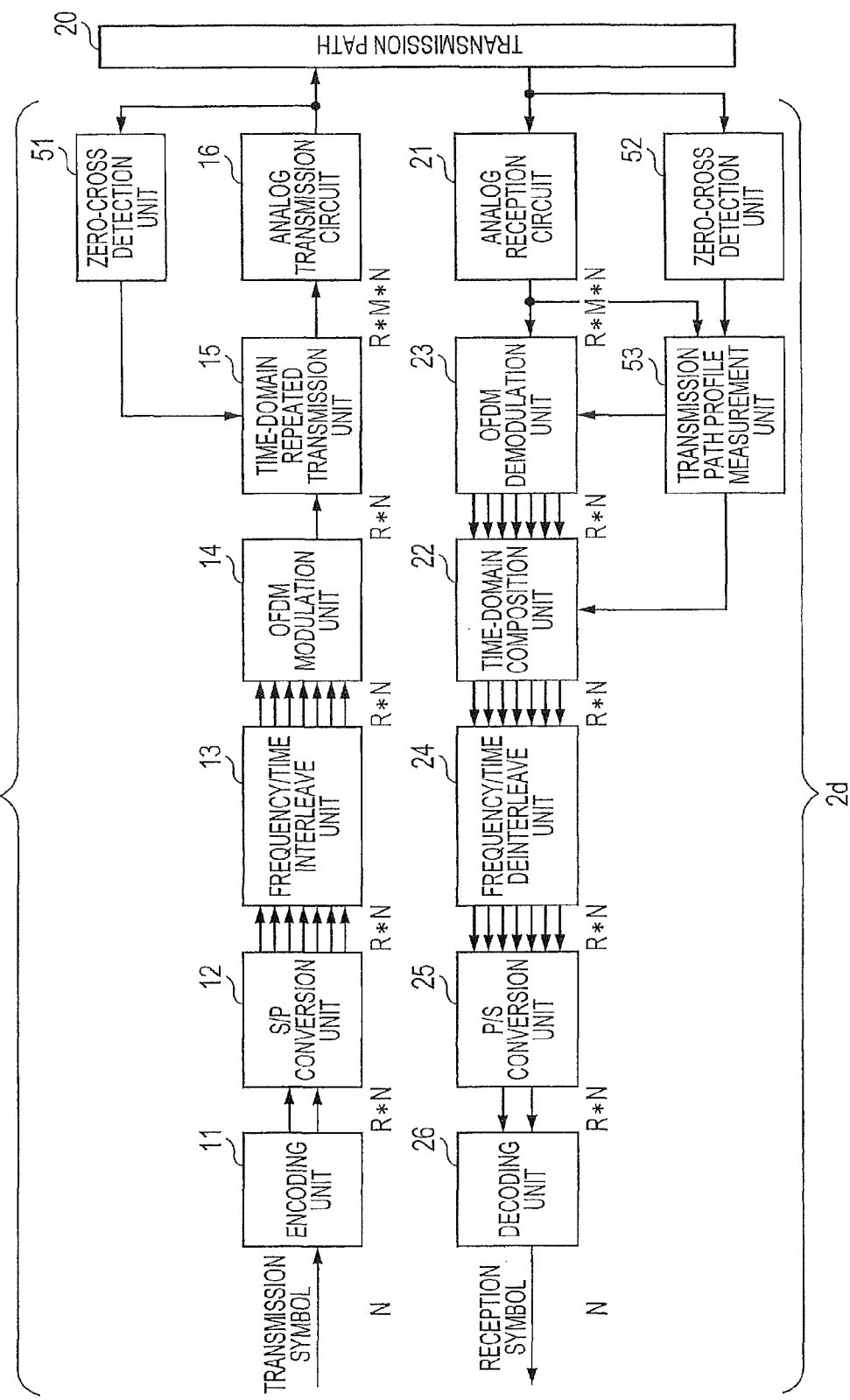
FIG. 8 is a block diagram showing the configuration of a power line carrier communication system according to a fourth embodiment.

A communication system 104 according to this embodiment will be described with reference to FIG. 8. FIG. 8 is a block diagram showing the configuration of the communication system according to this embodiment. In addition to the configuration of the second embodiment, the communication system 104 according to this embodiment includes a zero-cross detection unit 51, a zero-cross detection unit 52, and a transmission path profile measurement unit 53. Here, because the configurations of units other than the zero-cross detection unit 51, the zero-cross detection unit 52, and the transmission path profile measurement unit 53 are the same as those included in the first embodiment or in the second embodiment, the explanation about those unit will be omitted.

A transmission apparatus 1d includes the zero-cross detection unit 51. The zero-cross detection unit 51 detects the phase of an alternate-current power on the basis of the zero-cross points of the alternate-current power that is transmitted through a transmission path 20. Subsequently, the zero-cross detection unit 51 outputs the detected phase to a time-domain repeated transmission unit 15.

The time-domain repeated transmission unit 15 controls the timing at which a transmission symbol is repeatedly transmitted on the basis of the phase detected by the zero-cross detection unit 51. For example, the time-domain repeated transmission unit 15 sets the repeated transmission period of the transmission symbol to be K times (where K is a natural number) the half-period of the alternate-current power. In other words, the repeated transmission period of the transmission symbol is K/2 times the period of the alternate-current power on the transmission path 20. The repeated transmission period of the transmission symbol is a time needed for the transmission symbol to be repeatedly transmitted M times, and does not includes a time needed for preambles or the like. In the above described example, the repeated transmission period becomes M times the symbol length of the symbol S1-1. Alternatively, the zero-cross detection unit 51 included in the transmission unit 1d can be replaced with a timer or the like for detecting the phase of the alternate-current power.

Here, it will be assumed that one period of the transmission symbol is a time for one transmission of M-times transmissions of the transmission symbol. In other words, one period of the transmission symbol is one Mth of the repeated transmission period. In the above described example, one period of the transmission symbol becomes the symbol length of the symbol S1-1. If the period of the alternate-current power is not an integral multiple of one period of the transmission symbol, the last symbol runs off the period of the alternate-current power. In this case, it will be assumed that a front part of the data of the last symbol is adopted. In other words, the symbol length of the last symbol of symbols created by the reception signal being transmitted M times is made shorter than other symbols. By shortening the symbol length of the last symbol, the timing at which the last symbol ends can be matched with the period of the alternate-current power. As an alternative, the symbol length of the first symbol can be shortened in stead of the symbol length of the last symbol. In this way, the time-domain repeated transmission unit 15 adjusts the repeated transmission period of the transmission symbol and one period of the transmission symbol on the basis of the period of the alternate-current power.

A reception apparatus 2d includes the zero-cross detection unit 52 and the transmission path profile measurement unit 53. The zero-cross detection unit 52 detects the phase of the alternate-current power that is transmitted through a transmission path 20 as is the case of the zero-cross detection unit 51. Subsequently, the zero-cross detection unit 52 outputs the detected phase to the transmission path profile measurement unit 53.

The transmission path profile measurement unit 53 measures the profile of the transmission path 20. The transmission path profile measurement unit 53 measures the profile of the transmission path 20 that varies in a cycle of the half period of the alternate-current power in advance before receiving a frame. The transmission path profile measurement unit 53 determines symbol borders between the symbols created by the reception symbol being repeatedly transmitted on the basis of the measured transmission path profile. Subsequently, a time-domain composition unit 22 and an OFDM demodulation unit 23 perform their own processing on the basis of the symbol borders determined by the transmission path profile measurement unit 53. In other words, the OFDM demodulation and the composition are performed at the symbol borders determined by the transmission path profile measurement unit 53.

One example of the profile measurement methods is a method in which the variation of noise amounts is estimated using the average value of the absolute values of reception signals measured during times where any signals are not really transmitted in the half-period of the alternative-current power. As a time-domain composition method, a maximum ratio combining method can be conceivable in which a SNR (Signal-to-Noise Ratio) of each symbol estimated from the result of the transmission path profile measurement is utilized. In this method, because symbols corresponding to bad transmission path profiles have deteriorated SNRs, they have low weights.

The transmission path profile measurement unit 53 installed in the reception apparatus makes it possible for the OFDM demodulation unit 23 to adjust the symbol borders of the reception signals so as to be matched with the corresponding transmission path profiles. Therefore, a number of symbols that have less degradations can be received, which leads to the improvement of the reception characteristic. For example, noises on the transmission path 20 are often generated at certain phases of the alternate-current power on a power line. Therefore, the reception characteristic can be improved by determining the symbol borders on the basis of the transmission path profile.

Figure 9:
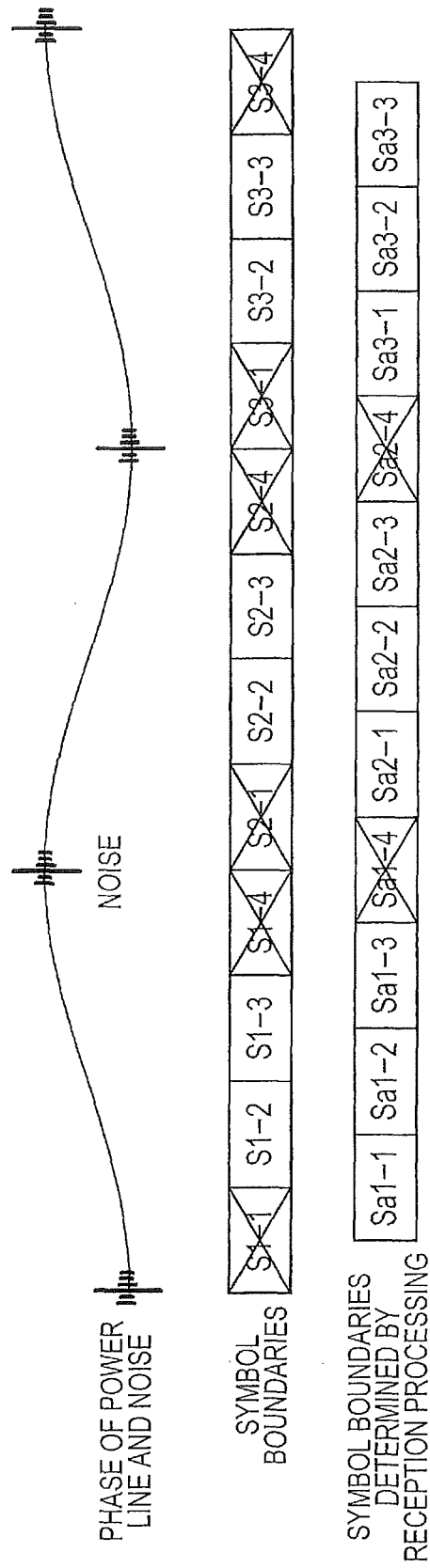
FIG. 9 is a diagram showing the reception symbol timing of a power line carrier communication system according to the fourth embodiment.

For example, it will be assumed that, as shown in FIG. 9, noises are generated at certain phases of the alternate-current power on the transmission path 20. At the timings of generations of noises, the demodulation characteristics of the symbols are deteriorated. In an example shown in FIG. 9, noises are generated in a cycle of a phase 180° of the alternate-current power. FIG. 9 shows that a noise is generated around the border between the symbol S1-4 and the symbol S2-1. The period of the noise generation straddles two symbols S1-4 and S2-1. In a similar way, a noise is generated around the border between the symbol S2-4 and the symbol S3-1. Therefore, the noises are superimposed respectively on two symbols S2-1 and S2-4 of four symbols S2-1 to S2-4 created by the transmission symbol being transmitted four times. In other words, the four symbols 52-1 to S2-4 created by the transmission symbol being transmitted four times includes the symbol S2-2 and the symbol S2-3 that are corresponding to good transmission path profiles and the symbol S2-1 and the symbol S2-4 that are corresponding to bad transmission profiles. Therefore, of the four symbols created by the transmission symbol being transmitted four times, there are only two symbols that are corresponding to good profiles of the transmission path 20. When a noise detection unit 32 detects the noises, a symbol waveform composition unit 31 does not use the symbol S2-1 and the symbol S2-4 for averaging.

Therefore, in this embodiment, the symbol borders are determined so as to reduce the number of symbols that are corresponding to bad profiles of the transmission path 20. FIG. 9 shows a symbol Sa1-1 to a symbol Sa3-3 which have symbol borders determined by the reception processing of the reception apparatus 2d. The symbol borders are determined so that the symbol Sa2-1 covers a period of noise generation. In other words, the transmission path profile measurement unit 53 determines the symbol borders so that a period of noise generation does not straddle plural symbols. In this case, although a noise is superimposed on the symbol Sa2-4, the noise is not superimposed on any of the symbol Sa2-1 to the symbol Sa2-3. Therefore, of the four symbols created by the transmission symbol being transmitted four times, there are three symbols that are corresponding to good profiles of the transmission path 20. In other words, demodulation can be performed using the three symbols corresponding to good profiles of the transmission path 20, which leads to the improvement of the reception characteristic.

In the above-described way, when the frame is received, the symbol borders are determined on the basis of the result of the transmission path profile measurement. In this case, while symbols corresponding to bad profiles of the transmission path are discarded, the phase of the alternate-current power is determined so that the number of symbols corresponding to good profiles becomes as large as possible. In other words, the symbol borders are determined so that the number of symbols to be discarded becomes as small as possible. In this case, it is not necessary for the symbol borders to coincide with the symbol borders set in the transmission apparatus side. The reason is that the symbols are the same because they are created by the same transmission symbol being repeatedly transmitted, and the transmission method in which guard intervals are not used between the symbols is adopted. Therefore, the reception characteristic can be easily improved. In addition, the symbol S1-1 to the symbol S1-4 are created on the basis of the same transmission symbol. Therefore, even if the symbol borders of the reception signals are determined at the side of the reception apparatus 2d independently of the transmission apparatus 1d side, the deterioration of the reception characteristic can be prevented.

Although, in this fourth embodiment, the profile measurement function is added to the second embodiment, the profile measurement function can be added to the first embodiment or to the third embodiment. In addition, in the fourth embodiment, it is conceivable that averaging can be performed regardless of the presence or absence of a noise. Alternatively, it is also conceivable that another composition method such as a maximum ratio combining method is adopted instead of the averaging. In addition, it is also conceivable that some of the first embodiment to the fourth embodiment are appropriately combined.

Although the present invention achieved by the inventors has been concretely described on the basis of some embodiments, the present invention is not limited to the above-described embodiments, and it goes without saying that various modifications may be made to the above-described embodiments without departing from the spirit and scope of the present invention.

What it claimed is:

1. A power line carrier transmission apparatus for transmitting a transmission symbol via a power line, the power line carrier transmission apparatus comprising:
an interleave unit interleaving the transmission symbol;
a modulation unit for modulating the transmission symbol interleaved by the interleave unit; and
a transmission unit repeatedly transmitting the transmission symbol modulated by the modulation unit M times (where M is an integer greater than 1),
wherein M symbols (where M denotes the number of the symbols), which are generated by repeatedly transmitting the transmission symbol M times by the transmission unit, are transmitted without guard intervals being added therebetween.

2. The power line carrier transmission apparatus according to claim 1, wherein the modulation unit modulates the transmission symbol interleaved by the interleave unit with an OFDM (Orthogonal Frequency Division Multiplexing) scheme.

3. The power line carrier transmission apparatus according to claim 1, wherein the modulation unit multiplexes data of the transmission symbol in parallel by using assigned subcarriers in the interleave unit.

4. The power line carrier transmission apparatus according to claim 1, further comprises a detector detecting the phase of the alternate-current power of the power line, wherein the transmission unit adjusts the repeated transmission period of the transmission symbol and one period of the repeated transmission symbol based on the period of an alternate-current power on the power line.

5. The power line carrier transmission apparatus according to claim 4, wherein the period of the repeated transmission is K/2 (where K is a natural number) times the period of the alternate-current power.

6. The power line carrier transmission apparatus according to claim 1, wherein the transmission unit repeatedly transmits a same transmission symbols that is stored in a buffer.

* * * * *